United States Patent [19]

Canfield

[11] 4,451,075
[45] May 29, 1984

[54] REMOVABLE STORAGE COVER FOR TRUCK BEDS

[76] Inventor: Henry A. Canfield, 12000 Saw Mill Rd., #307, The Woodlands, Tex. 77308

[21] Appl. No.: 403,852

[22] Filed: Jul. 30, 1982

[51] Int. Cl.³ .............................................. B60R 11/00
[52] U.S. Cl. .................................... 296/37.6; 296/15; 224/42.42
[58] Field of Search ...................... 296/24 R, 37.1, 50, 296/37.6, 57 R, 15; 224/42.42 R

[56] References Cited

U.S. PATENT DOCUMENTS

| | | | |
|---|---|---|---|
| 3,326,595 | 6/1967 | Ogilvie | 224/42.42 R |
| 3,664,704 | 5/1972 | Ellis | 296/24 R |
| 4,215,896 | 8/1980 | Drouin | 296/24 R |

*Primary Examiner*—Robert R. Song
*Attorney, Agent, or Firm*—Neal J. Mosely

[57] ABSTRACT

A removable storage cover for a pickup truck bed comprises a sloping back wall and a hinged top cover. The sloping back wall is secured at the bottom end on opposite sides by retractable pins which fit into holes drilled into the truck wheel wells. The top cover is hinged to the sloping back wall and closes against a pair of supporting rails on the interior side walls of the truck bed. In a second embodiment, the top end of the sloping back wall is secured to the interior side walls, and the bottom end is secured to the wheel wells of the truck bed by retractable pins which fit into holes drilled into the side walls and wheel wells. In a third embodiment, the top end of the sloping back wall rests on rubber bumpers secured in the interior side walls of the truck bed and has a peripherally extending flange which rests on the top of the side walls and the top of the tailgate when in a closed position. When the top cover is in a closed position, it may be locked by provision of a clasp and lock. Because of the aerodynamic shape of the storage cover construction, the truck bed has reduced wind resistance which results in increased gasoline mileage.

14 Claims, 6 Drawing Figures

REMOVABLE STORAGE COVER FOR TRUCK BEDS

BACKGROUND OF THE INVENTION

1. Field of the Invention

This invention relates to truck bed storage compartments, and more particularly to a removable storage cover having a novel construction which can be easily installed and removed, is capable of being locked closed, and provides decreased wind resistance.

2. Brief Description of the Prior Art

Storage compartments for pickup trucks are widely known in the prior art. The most common storage compartment is a rectangular metal tool box having two hinged lids. The tool box is bolted to and fits horizontally across the truck bed side walls just behind the truck cab. This type of storage box is very heavy and difficult to remove, should access to the entire bed area be desired. In addition, such tool boxes contribute undesirably to aerodynamic resistance.

Tonneau type bed covers formed of cloth or plastic fabric are widely used, but offer no protection from theft of stored articles. They are somewhat inconvenient to install and remove.

Deeds, U.S. Pat. No. 4,313,636 discloses a folding truck bed cover comprised of a series of hinged panels, at least one of which is secured to the truck bed side walls. The cover extends the entire length of the bed and may be opened from the cabin or tail end of the bed. The cover may be folded and stored across the side walls behind the cab. This type of cover is not easily removed, should access to the entire bed be desired.

Campbell, U.S. Pat. No. 4,252,362 discloses a pickup bed cover comprised of a relatively complex arrangement of a hand crank, tracks, and rollers, which allow a fabric or slatted canopy to be positioned to cover the entire bed or a portion thereof. The canopy may either be stored rolled up "window blind fashion" or folded into a series of pleats.

The prior art in general, and none of these patents in particular, disclose the present invention which has a sloping back wall secured to the interior of the truck bed by retractable pins and a lockable top cover hinged thereto.

SUMMARY OF THE INVENTION

It is therefore an object of the present invention to provide a removable storage cover for pickup trucks that is easily and quickly installed and removed.

Another object of this invention is to provide a removable storage cover for pickup trucks that protects the stored contents from weather and from theft.

Another object of this invention is to provide a removable storage cover for pickup trucks that will reduce wind resistance and therefore provide increased gasoline mileage.

Other objects of the invention will become apparent from time to time throughout the specification and claims as hereinafter related.

The above noted objects and other objects of the invention are accomplished by a removable storage cover for a pickup truck bed having a novel construction which cover can be easily installed and removed, is capable of being locked closed, and provides decreased wind resistance.

The removable storage cover for a pickup truck bed comprises a sloping back wall and a hinged top cover. The sloping back wall is secured at the bottom end on opposite sides by retractable pins which fit into holes drilled into the truck wheel wells. The top cover is hinged to the sloping back wall and closes against a pair of supporting rails on the interior side walls of the truck bed.

In a second embodiment, the top end of the sloping back wall is secured to the interior side walls, and the bottom end is secured to the wheel wells of the truck bed by retractable pins which fit into holes drilled into the side walls and wheel wells. In a third embodiment, the top end of the sloping back wall rests on rubber bumpers secured in the interior side walls of the truck bed and has a peripherally extending flange which rests on the top of the side walls and the top of the tailgate when in a closed position. When the top cover is in a closed position, it may be locked by provision of a clasp and lock. Because of the aerodynamic shape of the storage cover construction, the truck bed has reduced wind resistance which results in increased gasoline mileage.

DESCRIPTION OF THE PREFERRED EMBODIMENT

Figure 1:
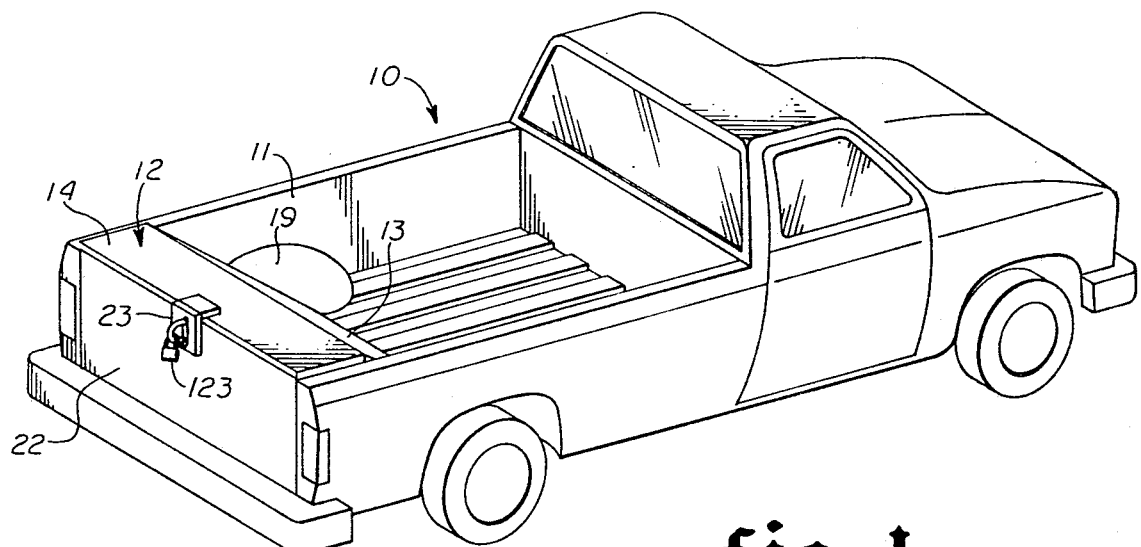
FIG. 1 is an isometric view of a removable storage cover installed in a pickup truck bed.
Figure 2:
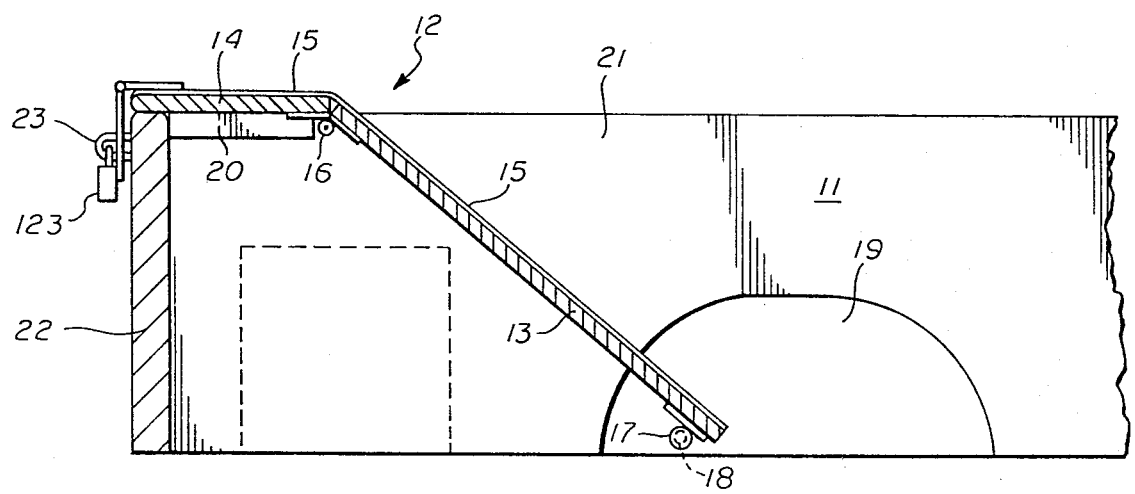
FIG. 2 is a view in longitudinal section of one embodiment of a removable storage cover for pickup truck beds.
Figure 3:
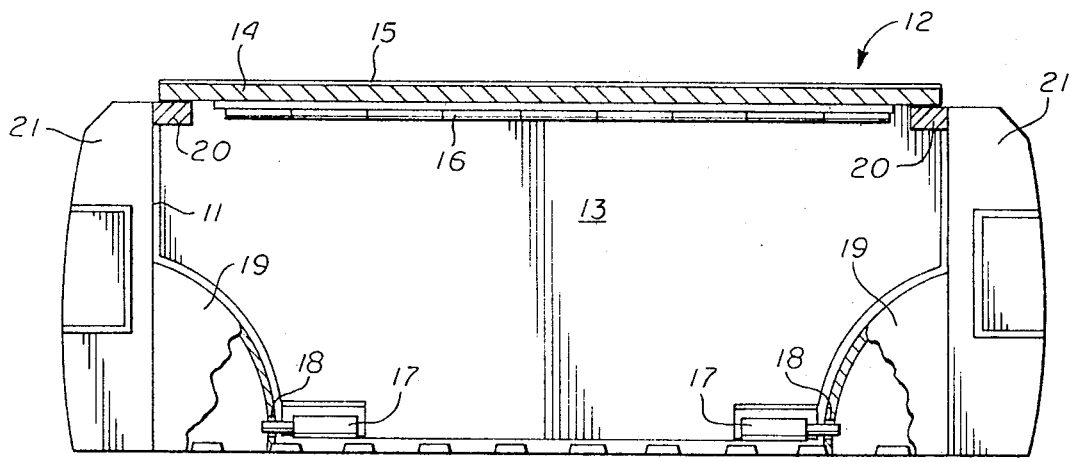
FIG. 3 is a view in cross section through the rear of the removable storage cover shown in FIGS. 1 and 2.

Referring to the drawings by numerals of reference, and more particularly to FIGS. 1, 2, and 3, a standard pickup truck 10, having a bed 11 is provided with a removable storage cover, in accordance with the invention, designated generally as 12.

Storage cover 12 comprises a sloping rigid panel or back wall 13 and a rigid horizontal panel or top cover 14, constructed, for example, of plywood, fiberboard, aluminum, plastic or other suitable material. The sloping back wall 13 and top cover 14 may be finished with a suitable protective coating such as varnish or shellac and may be provided with a covering 15 such as vinyl, or plastic for weather protection and appearance requirements.

The sloping back wall 13 and top cover 14 are connected together by conventional hinge means 16, preferably a piano type hinge, fastened to their lower surfaces to enable opening of top cover 14. Retractable pin latches 17 are located on opposite sides of the lower surface of sloping back wall 13. Retractable pin latches 17 are adapted to fit into holes 18 which are drilled in the truck wheel wells 19. It should be understood that the sloping back wall 13 may contain cut out corner portions to enable a close fit around the wheel wells 19.

Top cover 14 rests on, and closes against a pair of support rails 20 mounted on the truck bed side walls 21 near the tail gate 22. Support rails 20 may be of any suitable material, such as, wood or angle iron and are secured in place by sheet metal screws, adhesive, or other suitable means. Thus, in a closed position, the sloping back wall 13 and top cover 14 enclose a portion of the truck bed 11 as shown in FIGS. 1 and 2. The retractable pin latches 17 are contained within the enclosure and hidden from view. The removable storage cover is locked closed by a suitable locking means such as clasp 23 and lock 123.

The storage cover 12 enables access to the truck bed 11 through the top cover 14, or the tail gate 22. When access to the entire truck bed is desired, the retractable pin latches are retracted and the storage cover 12 may be lifted out, folded, and laid flat between the wheel well covers.

Figure 4:
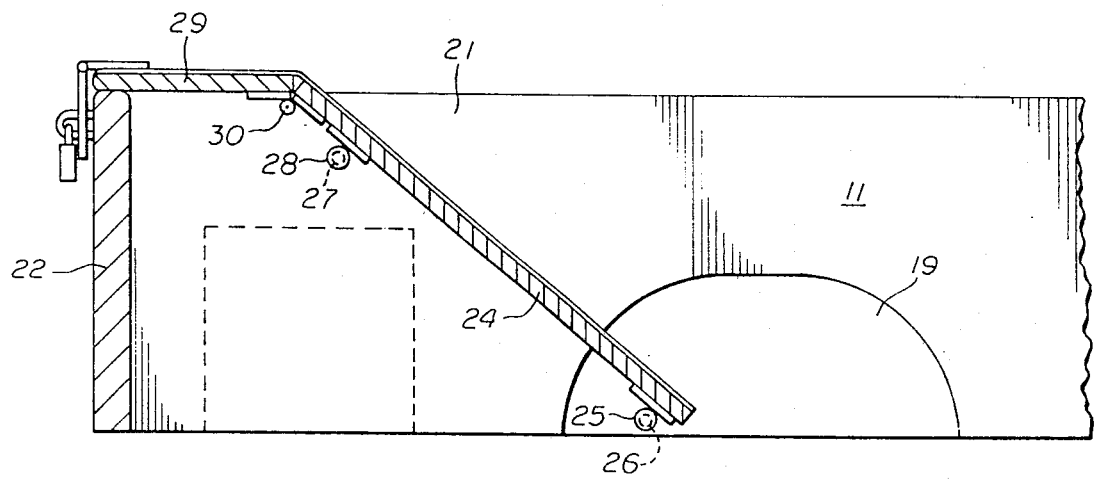
FIG. 4 is a view in longitudinal section of a second embodiment of a removable storage cover for pickup truck beds.

A modification of the embodiment of the invention of FIGS. 1, 2, and 3 is shown in FIG. 4. In this second embodiment, support rails are not used. Sloping back wall 24 is mounted in the pickup truck bed 11 by a pair of retractable pin latches 25 located on opposite sides of its lower surface near the bottom of the panel. Retractable pin latches 25 fit into holes 26 drilled in pickup truck wheel wells 18. A second pair of retractable pin latches 27 are located on opposite sides of the lower surface of sloping back wall 24 near the top of the panel. Retractable pin latches 27 fit into holes 28 drilled in the pickup truck side walls 21. A top cover member 29 is pivotally connected to the sloping back wall 24 by conventional hinge means 30, e.g. a piano type hinge.

Figure 6:
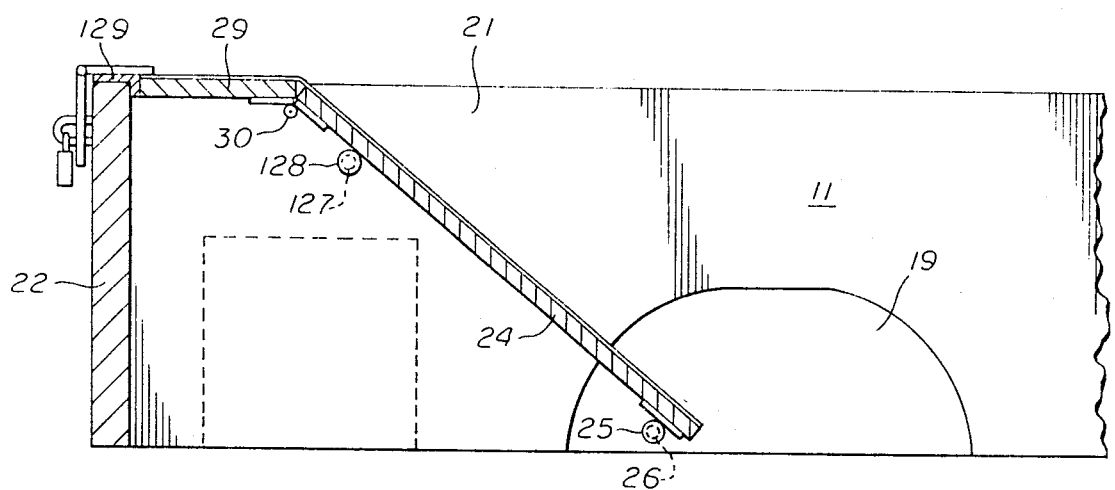
FIG. 6 is a view in longitudinal section, similar to FIG. 4, of the embodiment shown in FIG. 5.
Figure 5:
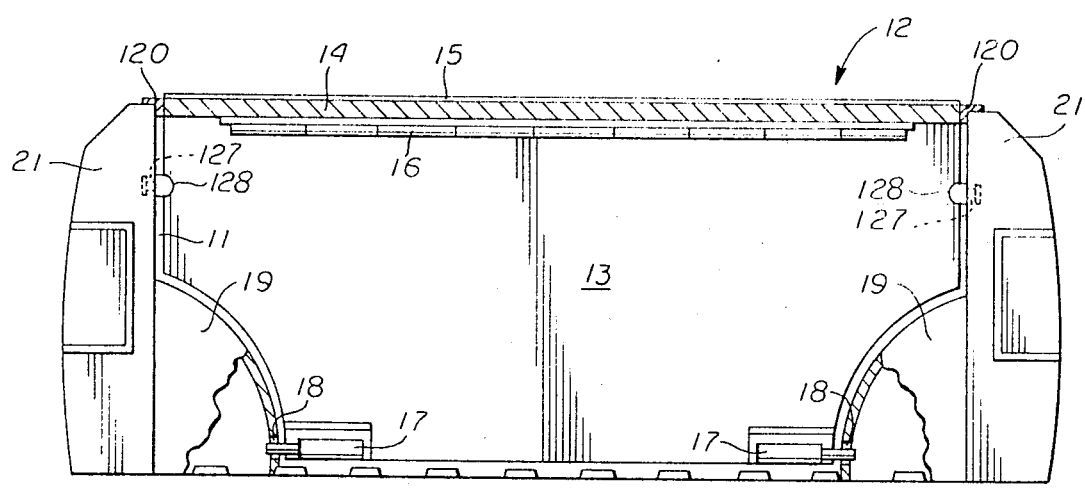
FIG. 5 is a view in cross section, similar to FIG. 3, of a further embodiment of the invention.

In FIGS. 5 and 6, there is shown a third embodiment of the invention. The sloping back wall 13 and top cover 14 are connected together by conventional hinge means 16, preferably a piano type hinge, fastened to their lower surfaces to enable opening of top cover 14. Retractable pin latches 17 are located on opposite sides of the lower surface of sloping back wall 13. Retractable pin latches 17 are adapted to fit into holes 18 which are drilled in the truck wheel wells 19. It should be understood that the sloping back wall 13 may contain cut out corner portions to enable a close fit around the wheel wells 19.

Top cover 14 rests on rubber bumpers 128 secured by pins 127 in the truck bed side walls 21. Angles or flanges 120 extend along opposite sides of the cover 29 and angle or flange 129 along the end wall thereof. Flanges 120 and 129 rest on the top of the side walls 21 and tailgate 22, respectively. Thus, in a closed position, the sloping back wall 13 and top cover 14 enclose a portion of the truck bed 11 as shown in FIGS. 1 and 2. The retractable pin latches 17 are contained within the enclosure and hidden from view. The removable storage cover is locked closed by a suitable internal or external locking means.

The storage cover 12 enables access to the to the truck bed 11 through the top cover 14, or the tail gate 22. When access to the entire truck bed is desired, the retractable pin latches are retracted and the storage cover 12 may be lifted out, folded, and laid flat between the wheel well covers.

It is to be noted that in the closed position, (FIGS. 1, 2, and 4), the removable storage cover prevents any access to the enclosed portion of the pickup truck bed by unauthorized personnel, and also protects the stored cargo from weather. It is also to be noted that the remaining portion of the truck bed is open for ordinary haulage requirements. It should be further noted that the sloping back wall provides an aerodynamic shape to the rear end of the truck bed, thus decreasing wind resistance. Extensive tests with this cover have yielded substantially improved highway gasoline mileage, on the order of 3-5 miles per gallon, for the pickup truck as compared to the mileage for the truck without the cover installed in place. It should also be noted that, while the cover shown in the drawings extends only for about one-fourth the length of the truck bed, the cover can be made longer or shorter as desired. It is expected that the cover will be made available in quarter, half and three-quarter truck bed lengths. Obviously, the size and shape of the cover can be varied to fit imported pickup trucks as well as standard American pickup truck sizes.

While this invention has been described fully and completely with special emphasis upon preferred embodiments, it should be understood that within the scope of the appended claims the invention may be practiced otherwise than is specifically described herein.

I claim:

1. In combination with a pickup truck, a removable storage cover for the bed of said truck comprising;
   a first rigid panel member positioned horizontally from side to side across the rear end portion of said truck bed, adjacent to the tailgate and supported on the side walls of said bed,
   a second rigid panel member positioned from side to side across the rear end portion of said truck bed, adjacent to said first rigid panel member and releasably attached in a fixed position to the side walls of said bed, extending angularly downward from the edge of said first panel member to the bed of said truck to provide a surface of low aerodynamic resistance,
   a hinge securing together the rear edge of said first panel member and the upper edge of said second panel member,
   said first and second panel members and the tailgate of said truck forming a secure enclosure, and
   said enclosure being accessible either by opening said tailgate or said second panel member.

2. A truck-storage cover combination according to claim 1 wherein,
   said hinge connecting said first and second panel members comprises a continuous piano-type hinge across the entire width thereof.

3. A truck-storage cover combination according to claim 1 wherein,
   said releasably attaching means comprises a pair of retractable pin mechanisms mounted on opposite ends of said second rigid panel member.

4. A truck-storage cover combination according to claim 3 wherein,
   said retractable pin mechanisms fit into openings in and oriented angularly of the wheel wells of said pickup truck bed when extended.

5. A truck-storage cover combination according to claim 3 wherein,
   said retractable pin mechanisms fit into openings in and oriented angularly of the side walls of said pickup truck bed when extended.

6. A truck-storage cover combination according to claim 1 wherein
   a pair of rubber bumpers are secured in the side walls of said truck bed in a position supporting said second rigid panel member in an angular position to provide a surface of low aerodynamic resistance.

7. A truck-storage cover combination according to claim 6 wherein said second panel member has a flange extending around the ends an rear edge thereof to engage the top of the truck bed side walls and the top of the tailgate when in a closed position.

8. A truck-storage cover combination according to claim 1 wherein,
said first and second panel members are provided with a protective covering.

9. A truck-storage cover combination according to claim 1 further comprising,
means for releasably locking said second panel member in a closed position against said tail gate.

10. A truck-storage cover combination according to claim 1 further comprising,
a pair of supporting rails secured to the side walls of the truck bed along the top rear portion thereof for supporting said second panel member in a closed position.

11. A removable storage cover for the bed of a pickup truck comprising;
a first rigid panel member of a size to extend laterally across said bed and having ends contoured to fit the walls of said bed in a horizontal position adjacent to the tail gate,
a second rigid panel member secured to said first panel member by a hinge connecting adjacent edges thereof and having a contour fitting the side walls of a truck bed when installed therein at an angle downward and forward from the edge of said first panel member,
means adapted to releasably attach said first and second panel members to the interior of said bed to form a secure enclosure accessible either by opening said tail gate or said second panel member.

12. A storage cover according to claim 11 wherein,
said releasable attaching means comprises a pair of retractable pin mechanisms mounted on opposite ends of said second rigid panel member adapted to fit into openings in the wheel well or side walls of said pickup truck bed when extended.

13. A storage cover according to claim 11 wherein,
said first and second panel members are each provided with a protective covering.

14. A storage cover according to claim 11 further comprising,
means for releasably locking said second panel member closed against the truck tail gate when installed on a pickup truck.

* * * * *